F. SHERWIN.
PRESS DRILL.
APPLICATION FILED APR. 16, 1918.
1,297,601.
Patented Mar. 18, 1919.
3 SHEETS—SHEET 1.
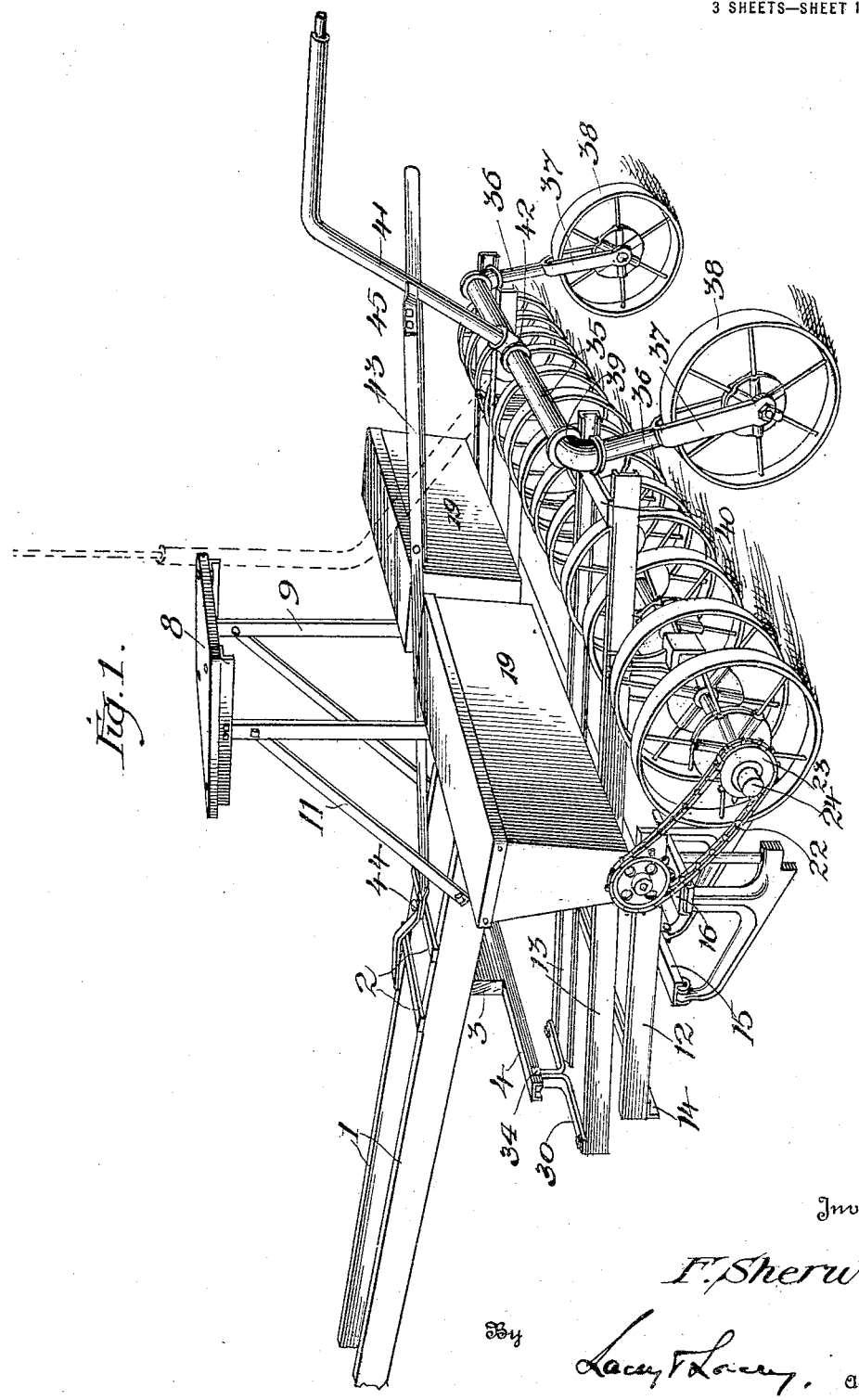
Inventor
F. Sherwin.
By Lacey & Lacey, Attorneys

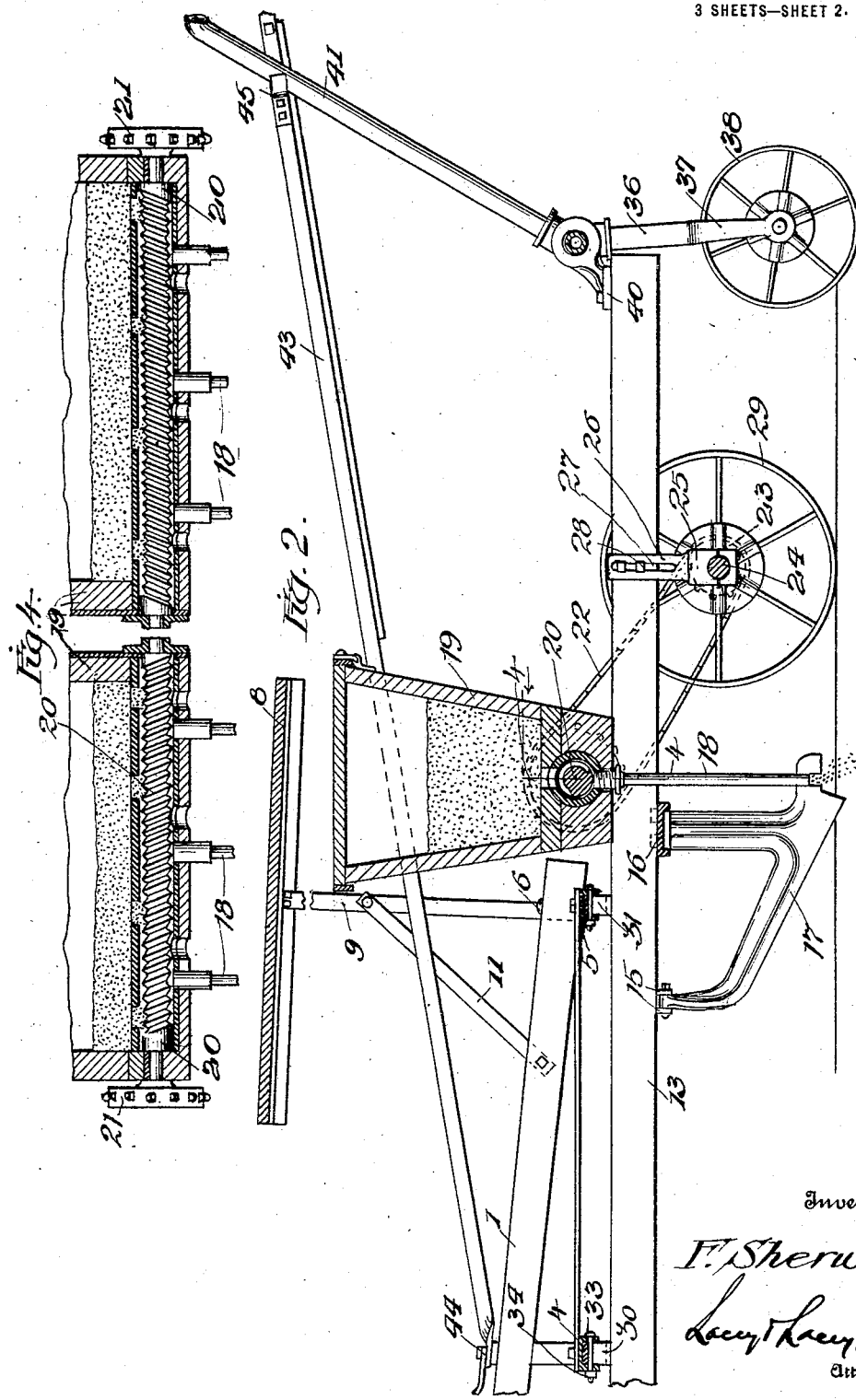

F. SHERWIN.
PRESS DRILL.
APPLICATION FILED APR. 16, 1918.
1,297,601.
Patented Mar. 18, 1919.
3 SHEETS—SHEET 3.
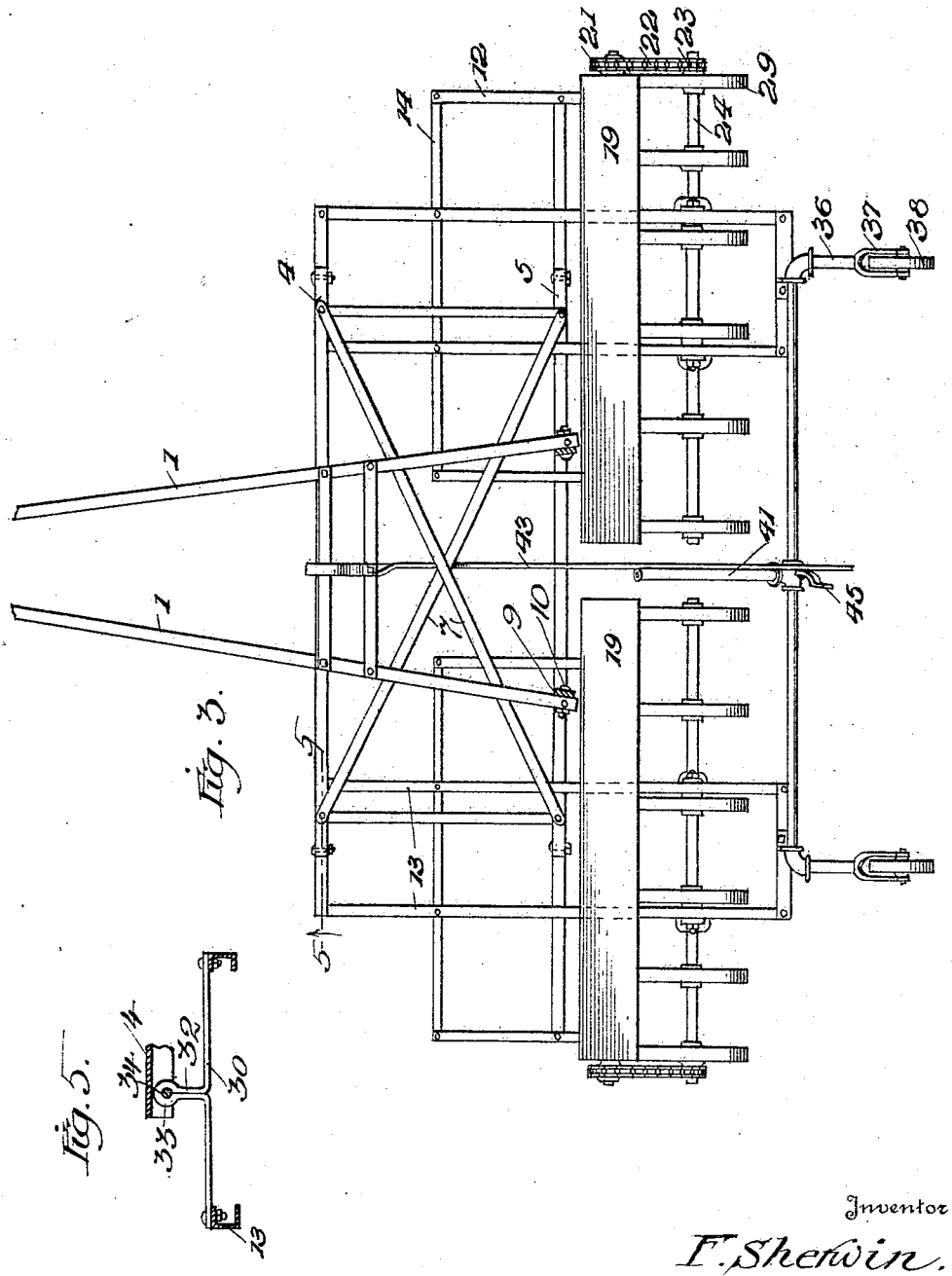

UNITED STATES PATENT OFFICE.

FRANK SHERWIN, OF BROOKINGS, SOUTH DAKOTA.

PRESS-DRILL.

1,297,601.　　　　　　Specification of Letters Patent.　　Patented Mar. 18, 1919.

Application filed April 16, 1918.　Serial No. 228,884.

*To all whom it may concern:*

Be it known that I, FRANK SHERWIN, a citizen of the United States, residing at Brookings, in the county of Brookings and State of South Dakota, have invented certain new and useful Improvements in Press-Drills, of which the following is a specification.

This invention relates to press drills for drill seeding grain, alfalfa, clover and all other grass seeds and more particularly to the riding type embodying planter shoes and following press wheels.

One of the primary objects of the present invention is to provide in a press drill of the type above mentioned means whereby the planting mechanism may be elevated clear of the ground surface and rendered inactive while the machine is being driven from one field to another, or when turning the machine at the ends of a field being planted, the machine embodying, for this purpose, transport wheels which are carried by a suitable frame mounted for rocking movement upon the frame of the machine in such a manner that the wheels may be brought into position to support the planting mechanism in elevated position, as stated above, or may be brought to a position clear of the ground so that the planting mechanism will travel over the plowed ground, the planter shoes and press wheels, in the latter instance, supporting the entire weight of the machine and the driver thereof as well as the entire weight of the transport wheels and the oscillatory carrier frame therefor, thus insuring of a thorough packing of the soil about the seed as planted.

Another object of the invention is to provide a seed drill of the class described built in two sections each embracing planter mechanism, the sections being so mounted beneath the tongue frame of the machine as to permit of free lateral oscillatory movement of the sections independent of each other, whereby the planting mechanisms of the two sections may readily adapt themselves to irregularities in the ground surface, as for example when traveling lengthwise of dead furrows and back furrows and over rough places in the field. At the same time the invention contemplates so mounting the two planter sections of the machine that while they may have the independent oscillatory motion just referred to, they will yet be maintained in true parallelism.

Another object of the invention is to provide means whereby the depth to which the drill shoes enter the ground may be varied as desired so as to regulate the depth at which the seed are deposited in the soil.

In the accompanying drawings:

Figure 1 is a perspective view of the machine embodying the present invention;

Fig. 2 is a vertical front to rear sectional view therethrough;

Fig. 3 is a top plan view of the machine;

Fig. 4 is a vertical longitudinal sectional view through the seed boxes of the machine taken substantially on the line 4—4 of Fig. 2;

Fig. 5 is a detail vertical longitudinal sectional view taken substantially on the line 5—5 of Fig. 3.

Generally speaking the machine embodying the present invention comprises a tongue frame which constitutes the main frame of the machine; frames which are mounted for transverse oscillatory motion beneath the tongue frame and each of which carries a seed box, the drill shoes and press wheels, from the shaft of which wheels the seed dropping mechanism within the seed boxes is operated: and, a transporting device including bearings mounted upon the planter frames, a frame mounted for swinging movement in the bearings, means for swinging the last-mentioned frame, and carrier or transport wheels mounted in the said last-mentioned frame.

In the drawings the tongue frame is illustrated as including tongue beams 1 which constitute the tongue proper and which are connected and relatively braced by suitable cross-pieces 2 located near their rear ends. The beams 1 forwardly of their rear ends are secured to and supported upon a bolster 3 which in turn is secured to and supported by a forward frame bar 4 which extends transversely beneath the beams 1 and which is preferably of channel iron construction, the bar being arranged with its channeled sides presented downwardly. A similar frame bar 5 is arranged rearwardly of the bar 4 and parallel thereto, and the rear ends of the tongue beams 1 are bolted or otherwise secured thereto, as indicated by the numeral 6. The frame bars 4 and 5 are relatively braced by means of diagonal brace bars 7 bolted at their ends to the said frame bars and crossing each other at a point between the tongue beams 1. A driver's seat 8 is supported at the upper ends of seat standards 9 which are secured at their lower ends, as indicated by the numeral 10, to the rear ends of the tongue beams 1 and are braced by means of brace bars 11 secured at their upper ends to the said standards 9 and at their lower ends to the said tongue beams.

Each of the planter frames comprises side beams 12 and a pair of intermediate beams 13 arranged parallel to each other and parallel to the side beams 12 and between the latter beams as clearly shown in Fig. 3 of the drawings. A cross bar 14 is secured to the under-sides of the beams 12 and 13 of each planter frame at the front ends of the side beams, and similar bars 15 and 16 are also secured to the under-sides of the beams 12 and 13, the latter bars serving to support the drill shoes 17 of each planter section, which shoes are of the ordinary or any preferred construction, and have seed delivered to them through seed tubes 18 leading downwardly from a seed box 19 which is suitably secured upon the upper sides of the beams 12 and 13 of the respective planter frame, it being understood that each planter frame supports a seed box, and in like manner supports a series of the drill shoes 17. The means provided for delivering seed from the seed boxes 19 to the respective series of seed tubes 18 is substantially identical with the structure shown in my patent issued May 2, 1916, No. 1,181,930. While in the patented structure a single screw shaft was mounted for rotation within the lower portions of both of the seed boxes and, consequently, extended between the adjacent ends of the boxes, in the present construction two shafts are provided, one for each seed box and indicated by the numeral 20, so that there is no connection between the adjacent ends of the seed boxes to interfere with their relative movement when their respective planter frames independently oscillate, as will be presently explained. Each of the screw shafts 20 projects at one end beyond the outer end of the respective seed box and has fixed upon its said end a sprocket gear 21 about which passes a sprocket chain 22. The chains 22 pass also about sprockets 23 which are mounted upon the outer ends of shafts 24, it being understood that there are two of the shafts 24 and one mounted upon each of the planter frames, the said shafts being independent of each other. Each of the shafts 24 is journaled in suitable bearing boxes 25 supported at the lower ends of bracket members 26 formed with vertical slots 27 and secured to the intermediate beams 13 rearwardly of the seed boxes 19 by means of bolts 28 which fit through the said slots 27. Of course, by loosening the bolts 28 the bracket members 26 may be vertically raised or lowered so as to correspondingly adjust the respective shafts 24 and the press wheels of the planter mechanism, which are indicated by the numeral 29 and are fixed upon the said shafts. Thus by adjusting the bearing boxes the depth to which the drill shoes 17 are permitted to enter the ground may be varied in accordance with the depth at which it is desired the seed shall be planted. As is usual the press wheels 29 travel behind the shoes 17 so as to press down the soil upon the planted seed.

In mounting the planter frames beneath the tongue frame, each of the planter frames has secured upon its beams 13 front and rear bolsters, indicated respectively by the numerals 30 and 31, the front bolster being located at the forward end of the beams 13 and the rear bolster being located immediately forwardly of the respective seed box 19. Each of these bolsters is formed from a suitable length of bar metal which between its ends is bent upon itself to form an upstanding portion 32 and an eye 33 and the said eyes 33 of the front and rear bolsters are respectively received between the depending flanges of the front and rear cross bars 4 and 5 of the tongue frame in the manner clearly shown in Fig. 5 of the drawings, a pivot bolt 34 being fitted through the said flanges and through the eye 33. In this manner each planter frame is mounted beneath the tongue frame in a manner to permit of its oscillation transversely with relation thereto, the pivots comprising the bolts 34 and eyes 33 being located, of course, in front to rear alinement in the instance of each planter frame. It will be apparent from the foregoing that as the machine is traveling over uneven ground, or for example, over dead furrows or back furrows, the shoes and press wheels may accommodate themselves to the inequalities in the ground surface as the planter frames may tilt or oscillate laterally and, consequently, the machine is not subjected to the strain which would otherwise be imposed upon it if the planter frames were rigid, and furthermore the planting or drilling operation is more effectually performed.

The transporting device, as before stated, includes a frame carrying wheels and the said frame comprises a transverse member 35 and side members 36 which extend at right angles from the ends of the member 35 and which carry yokes 37 in which are mounted ground wheels 38. The member 35 of the frame is supported for free rocking motion in suitable bearing eyes 39 mounted upon cross pieces 40 which extend between the intermediate beams 13 of the planter frames, the engagement of the member 35 in the bearing eyes 39 being sufficiently loose as not to interfere with the free oscillation of the respective bearing frames, and the said eyes 39 being located in front to rear alinement with the pivots 34 for the said planter frames. The side members 36 of the transporting frame are of such length and the wheels 38 are of such diameter that when the frame is rocked in its bearings so that the portion 36 will extend substantially vertically, as shown in Fig. 2 of the drawings, the shoes 17 and press wheels 29 will be lifted clear of the ground surface. In order that the frame of the transporting device may be so swung, a hand lever 41 is secured to the member 35 of the frame at an intermediate point, as indicated by the numeral 42, and by swinging this lever forwardly or rearwardly the frame may be swung respectively rearwardly or forwardly so as to move the wheels 38 out of and into position to support the machine for travel without operation of the planter mechanism. In order that the lever 41 may be held in its rearwardly swung position, there is provided a detent bar 43 which is secured at its forward end as at 44, to the cross members 2 extending between the tongue beams 1, and this bar extends rearwardly between the seed boxes, as shown in Fig. 1 of the drawings, and is provided at a suitable point in its length with an outstanding bracket or rest 45 behind which the lever 41 may be engaged when the said lever has been swung to position to elevate the shoes and press wheels clear of the ground surface.

Having thus described the invention, what is claimed as new is:

1. In a planter, a main frame, independent planter frames connected therewith for independent transverse oscillation, a planter mechanism carried by each planter frame, a transporting frame including a continuous member journaled for oscillation upon the planter frames longitudinally thereof, said member bridging the planter frames and the journals for the said member being located in front to rear alinement with the connections between the respective planter frame and the main frame and loose, whereby the planter frames may have transverse oscillatory motion with relation to the transporting frame, ground wheels mounted upon the transporting frame, and means whereby the transporting frame may be oscillated to move the ground wheels into and out of supporting position.

2. The combination of a rigid tongue frame, planter frames mounted on the under side of the tongue frame for independent oscillation transversely of the tongue frame, and a transporting frame mounted on the rear ends of the planter frames for oscillating movement longitudinally thereof, said transporting frame having a wheel adapted to run on the ground.

3. The combination of a rigid tongue frame, planter frames mounted on the under side of the tongue frame and carrying planter shoes and presser wheels, a rock shaft mounted transversely on the rear ends of the planter frames and having longitudinally disposed arms at its ends, wheels carried by the free ends of said arms, a handle member extending from said rock shaft, and a detent bar secured on the tongue frame and extending rearwardly therefrom to be engaged by said handle member.

In testimony whereof I affix my signature.

FRANK SHERWIN. [L. S.]

Copies of this patent may be obtained for five cents each, by addressing the "Commissioner of Patents, Washington, D. C."